US 8,412,918 B1

(12) United States Patent
Allen et al.

(10) Patent No.: US 8,412,918 B1
(45) Date of Patent: *Apr. 2, 2013

(54) BOOTING MECHANISM FOR FPGA-BASED EMBEDDED SYSTEM

(75) Inventors: Timothy P. Allen, Santa Cruz, CA (US); Andrew Draper, Chesham (GB); Aaron Ferrucci, Santa Cruz, CA (US); Kerry Veenstra, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 12/887,982

(22) Filed: Sep. 22, 2010

Related U.S. Application Data

(63) Continuation of application No. 11/372,532, filed on Mar. 10, 2006, now Pat. No. 7,822,958.

(51) Int. Cl.
   G06F 9/00 (2006.01)
   G06F 9/24 (2006.01)
   G06F 15/177 (2006.01)
   G06F 12/00 (2006.01)

(52) U.S. Cl. ............... 713/1; 713/2; 711/100; 711/103; 711/148

(58) Field of Classification Search .................. 713/1, 2; 711/100, 103, 148
   See application file for complete search history.

(56) References Cited

U.S. PATENT DOCUMENTS

| | | | |
|---|---|---|---|
| 6,049,222 A | 4/2000 | Lawman | |
| 6,732,263 B1 | 5/2004 | May et al. | |
| 6,948,147 B1 | 9/2005 | New et al. | |
| 6,976,160 B1 | 12/2005 | Yin et al. | |
| 7,051,169 B2 | 5/2006 | Ganton | |
| 7,095,247 B1 | 8/2006 | Tang et al. | |
| 7,243,227 B1 | 7/2007 | Knapp | |
| 7,281,082 B1 | 10/2007 | Knapp | |
| 7,328,335 B1 | 2/2008 | Sundararajan et al. | |
| 7,822,958 B1* | 10/2010 | Allen et al. | 713/1 |
| 7,849,302 B2* | 12/2010 | Wu | 713/2 |
| 2003/0128050 A1 | 7/2003 | Schultz | |
| 2003/0163656 A1 | 8/2003 | Ganton | |
| 2003/0172261 A1* | 9/2003 | Lee et al. | 713/1 |
| 2004/0158699 A1 | 8/2004 | Rhoads et al. | |
| 2005/0160217 A1* | 7/2005 | Gonzalez et al. | 711/6 |
| 2006/0064575 A1* | 3/2006 | Jo | 713/2 |
| 2006/0077193 A1 | 4/2006 | Thielemans et al. | |
| 2006/0174100 A1* | 8/2006 | Park | 713/2 |
| 2006/0218323 A1* | 9/2006 | Chen et al. | 710/65 |
| 2006/0236204 A1* | 10/2006 | Lee et al. | 714/763 |
| 2006/0245274 A1 | 11/2006 | Choi et al. | |
| 2007/0174602 A1* | 7/2007 | Kao | 713/2 |
| 2008/0215870 A1* | 9/2008 | Liew | 713/2 |

* cited by examiner

OTHER PUBLICATIONS

Nios II Flash Programmer User Guide, Dec. 2004, Altera Corporation.

*Primary Examiner* — Vincent Tran
(74) *Attorney, Agent, or Firm* — Weaver Austin Villenueve & Sampson LLP

(57) ABSTRACT

According to various embodiments, a programmable device assembly includes an FPGA coupled to a nonvolatile serial configuration memory (e.g., serial flash memory) and a volatile fast bulk memory (e.g., SRAM or SDRAM). The nonvolatile serial configuration memory contains both the FPGA configuration data and CPU instructions. When a predetermined condition occurs, a serial memory access component that is hard coded on the FPGA automatically reads the configuration data from the nonvolatile serial configuration memory. The configuration data is used to configure the FPGA with various components, including a CPU, a boot ROM with code for a boot copier, and a bus structure. When the CPU boots, code for the boot copier is executed so that the CPU instructions are copied from the nonvolatile serial configuration memory to the volatile fast bulk memory. The CPU then executes the CPU instructions stored in the volatile fast bulk memory.

22 Claims, 6 Drawing Sheets

BOOTING MECHANISM FOR FPGA-BASED EMBEDDED SYSTEM

CROSS-REFERENCED TO RELATED APPLICATIONS

This application claims priority under 35 U.S.C. §120 and is a continuation of co-pending U.S. patent application Ser. No. 11/372,532, filed Mar. 10, 2006, titled "BOOTING MECHANISM FOR FPGA-BASED EMBEDDED SYSTEM", which is hereby incorporated by reference in its entirety.

BACKGROUND

1. Field of the Invention

The present invention generally relates to programmable chip systems. More specifically, the invention relates to mechanisms and techniques for booting FPGA-based embedded systems.

2. Description of Related Art

The central processing unit (CPU) of an embedded system must start up or "boot" when it first receives power and then again whenever it receives a reset pulse. Usually, the instructions that the processor executes are stored in nonvolatile memory (e.g., EPROM, EEPROM, or ROM) or in a nonvolatile memory on the micro-controller device.

In embedded systems that contain a field programmable gate array (FPGA), the FPGA must configure itself when it first receives power and then again whenever it receives a reconfigure pulse. Usually, the configuration data for an FPGA is also stored in a separate nonvolatile memory.

Although storing the CPU instructions and the FPGA configuration data on separate nonvolatile memories is typical for most FPGA-based embedded systems, storing them together on a single nonvolatile parallel configuration memory may suffice as well.

To further elaborate on the above, one approach has an external nonvolatile memory that contains FPGA configuration data, and the configured FPGA contains a boot ROM in its design. In this case, the data for the FPGA's ROM is stored as part of the FPGA configuration and is loaded into the FPGA's RAM, which then acts like a boot ROM. The CPU just needs to boot normally by accessing instructions in the boot ROM. The disadvantage of this approach is that it uses relatively expensive on-chip RAM to hold the CPU instructions.

Another approach has an external nonvolatile parallel memory that contains both FPGA configuration data and CPU boot instructions written to non-overlapping locations. A CPU that is part of the configured FPGA retrieves instructions directly from the external nonvolatile parallel memory. This approach has the advantage that no on-chip RAM is needed for boot memory, but it has the disadvantage that accessing external nonvolatile memory is slow.

Another approach instructs the CPU to copy the boot instructions to external SRAM or SDRAM to enhance the performance of the executing system. The CPU then transfers execution to the copy of the boot code in SRAM or SDRAM. These kinds of memory are much less expensive than on-chip RAM and faster than off-chip nonvolatile memory, but they have many address and data pins which must be connected to corresponding FPGA pins, thereby adding to the FPGA cost.

Yet another approach has an external configuration controller that configures the FPGA with data from an external nonvolatile parallel memory. The disadvantage of this approach is that it uses an additional external logic device.

Therefore, it is desirable to provide improved methods and apparatus for booting FPGA-based embedded systems in order to better utilize FPGA resources, improve system performance, and/or minimize associated costs.

SUMMARY OF THE INVENTION

The techniques and mechanisms of the present invention provide efficient and cost effective solutions for handling a predetermined condition/event (e.g., powerup, reset, and/or reconfigure conditions) associated with a programmable chip system. The predetermined condition/event includes instances where either the CPU must be booted and/or the FPGA must be configured or reconfigured. According to various aspects of the present invention, FPGA configuration data and CPU instructions are stored in at least one nonvolatile serial configuration memory where the FPGA configuration data and/or CPU instructions are accessed upon occurrence of the predetermined condition.

One aspect of the present invention provides a programmable device assembly. The programmable device assembly includes a programmable device, a nonvolatile serial configuration memory, and a booting mechanism. At least two types of information are stored within the nonvolatile serial configuration memory. Upon a predetermined condition, the booting mechanism can access the information stored in the nonvolatile serial configuration memory such that the information is useable by the programmable device. According to various embodiments, the two types of information include configuration data and CPU instructions. By storing FPGA configuration data and CPU instructions in the same nonvolatile serial configuration memory, the component count for the system can be minimized as compared with conventional systems.

Another aspect of the present invention provides a method for booting a programmable device. A predetermined condition is detected. A nonvolatile serial configuration memory is accessed. The programmable device is configured with a CPU and a boot copier by using configuration data from the nonvolatile serial configuration memory. The CPU is wakened and directed to execute CPU instructions from a volatile memory.

Another aspect of the present invention provides a programmable device assembly that includes means for detecting a predetermined condition; means for accessing a nonvolatile serial configuration memory; means for configuring the programmable device with a CPU and a boot copier; means for waking up the CPU; and means for directing the CPU to execute CPU instructions from a volatile memory.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
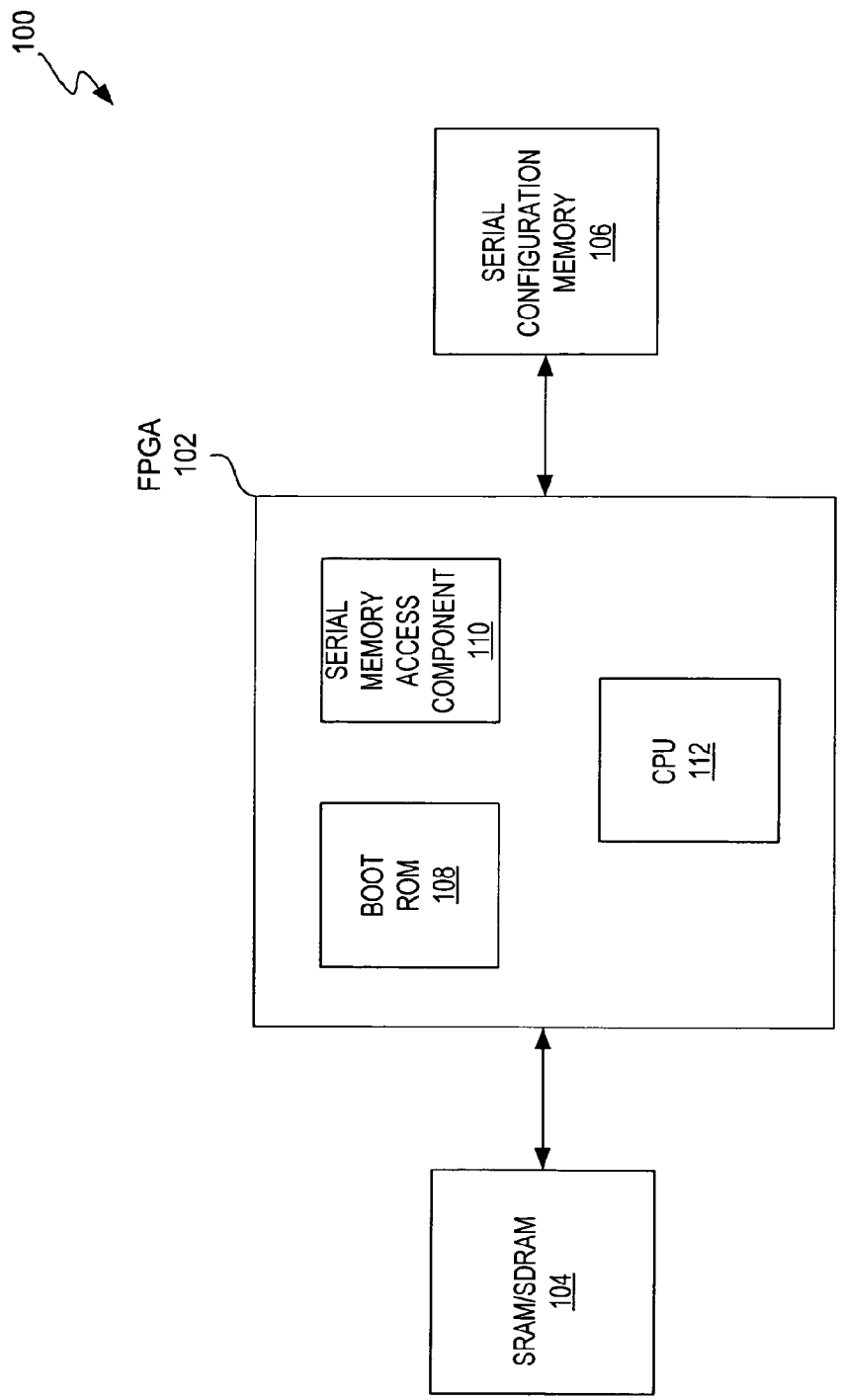
FIG. 1 illustrates a programmable device assembly having a booting mechanism according to various embodiments of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For instance, the techniques of the present invention will be described in the context of particular design automation tools. However, it should be noted that the techniques of the present invention can be applied to a variety of tools and associated code provided with the tools. In the following description, numerous specific details are set forth in order to provide a thorough understanding of the present invention. The present invention may be practiced without some or all of these specific details. In other instances, well known process operations have not been described in detail in order not to unnecessarily obscure the present invention.

According to various embodiments of the present invention, a programmable device assembly includes an FPGA coupled to a nonvolatile serial configuration memory (e.g., serial flash memory) and a volatile fast bulk memory (e.g., SRAM or SDRAM). The nonvolatile serial configuration memory contains both the FPGA configuration data and CPU instructions. When a predetermined condition occurs, a serial memory access component that is hard coded on the FPGA automatically reads the configuration data from the nonvolatile serial configuration memory. The configuration data is used to configure the FPGA with various components, including a CPU, a boot ROM with code for a boot copier, and a bus structure. When the CPU boots, code for the boot copier is executed so that the CPU instructions are copied from the nonvolatile serial configuration memory to the volatile fast bulk memory. The CPU then executes the CPU instructions stored in the volatile fast bulk memory.

Nonvolatile configuration memories include nonvolatile parallel configuration memories and nonvolatile serial configuration memories. Both types of nonvolatile configuration memories have a set of dedicated pins for communication. In order to communicate with components on an FPGA, a corresponding set of pins is generally allocated on the FPGA. The more pins there are in the corresponding set of pins, the more area real estate of the FPGA is used. For example, there could be about 30 to 40 pins allocated on the FPGA and operable to interface with a nonvolatile parallel configuration memory, which itself could have about 60 to 80 pins. Since the FPGA's die area real estate is often limited, this arrangement can be costly in terms of managing FPGA resources. On the other hand, there could be about 3 pins allocated on the FPGA and operable to interface with a nonvolatile serial configuration memory, which itself could have about 3 to 6 pins. As compared to using a nonvolatile parallel configuration memory, using a nonvolatile serial configuration memory can often better utilize FPGA resources while minimize FPGA costs.

One of the many advantages of the present invention allows a design to use minimal component counts: FPGA+external volatile memory+external nonvolatile memory. This arrangement essentially uses a single component from each of the three most popular semiconductor processes: logic, volatile memory, and nonvolatile memory. This arrangement presents a minimal cost solution for handling a predetermined condition/event. Conventional designs of using both an FPGA nonvolatile configuration memory and a parallel nonvolatile memory can be avoided. Further, design tools can be operable to easily implement various aspects of the present invention. For example, a design tool can create a linker script that locates CPU instructions as required by the system design.

FIG. 1 illustrates a programmable device assembly 100 having a booting mechanism according to various embodiments of the present invention. Any mechanism for handling a predetermined condition/event (e.g., powerup, reset, reconfigure) is referred to herein as a booting mechanism. Programmable device assembly 100 includes an FPGA 102 coupled in communication to a volatile fast bulk memory 104 (e.g., SRAM/SDRAM) and a nonvolatile serial configuration memory 106 (e.g., serial flash memory). FPGA 102 includes a processor core 112 (e.g., CPU), a boot ROM 108, and a serial memory access component 110. FPGA 102 also includes various components (not shown) for facilitating a booting sequence. For example, bus structures and on-chip memory resources are also included in FPGA 102. Components of programmable device assembly 100 can be implemented in any combination on a single die or on multiple dice.

Volatile fast bulk memory 104 is typically off chip memory. Volatile fast bulk memory 104 generally includes SRAM or SDRAM. Volatile fast bulk memory 104 can be operable to store any amount of information and/or perform faster than nonvolatile memory, such as nonvolatile serial configuration memory 106. In general, volatile fast bulk memory 104 can be natively/directly accessed by a processor.

Nonvolatile serial configuration memory 106 is typically off chip memory as well. Nonvolatile serial configuration memory 106 generally includes any serial flash memory. In a specific embodiment, nonvolatile serial configuration memory 106 uses a serial peripheral interface (SPI)—(e.g., 3-pin interface for data in, data out, and clock signals). Typically, nonvolatile serial configuration memory 106 has fewer pins for communication than a nonvolatile parallel configuration memory.

Nonvolatile serial configuration memory 106 can be operable to store any amount of information. For example, nonvolatile serial configuration memory 106 can store between 1-64 megabits of information. In a specific embodiment, nonvolatile serial configuration memory 106 is a passive device. That is, commands are usually driven into nonvolatile serial configuration memory 106 in order for it to work. In general, nonvolatile serial configuration memory 106 cannot be natively/directly accessed by a processor.

Boot ROM 108 is operable to store program code for a boot copier, which facilitates copying of information. According to various embodiments, the boot copier copies the CPU instructions from the nonvolatile serial configuration memory 106 to the volatile fast bulk memory 104. In general, the boot copier is operable to read at least one memory byte from any address in the nonvolatile serial configuration memory. Commands may be issued to the nonvolatile serial configuration memory in order to read the byte from the nonvolatile serial configuration memory.

Serial memory access component 110 is operable to access the nonvolatile serial configuration memory 106. Any mechanism or technique may be used to access the nonvolatile serial configuration memory 106. For example, a state machine may be used. Typically, serial memory access component 110 includes an interface configured to communicate with the nonvolatile serial configuration memory 106. According to a specific embodiment, serial memory access component 110 implements the hardware aspects of a serial peripheral interface (e.g., 3-pin interface for data in, data out, and clock signals). Serial memory access component 110 may also include associated logic for driving the serial peripheral interface. For example, serial memory access component 110 may have logic for issuing commands to the nonvolatile serial configuration memory. The logic may automatically drive bits via the SPI to search for the nonvolatile serial configuration memory 106 when the FPGA wakes up or upon occurrence of a predetermined condition/event. According to various embodiments, serial memory access component 110 is hard code/logic (e.g., non-programmable logic dedicated for a particular function).

To further elaborate, serial memory access component 110 can provide a state machine that can search and find nonvolatile serial configuration memory 106 via the SPI. It can also read data out from nonvolatile serial configuration memory 106. For example, serial memory access component can read the FPGA configuration data out from nonvolatile serial configuration memory 106 and transfer it to the FPGA's on-chip memory resource to configure the FPGA. After the FPGA is configured, access to nonvolatile serial configuration memory 106 can still be provided by serial memory access component 110. Even while the FPGA is operating, system components can communicate with the serial memory access component, which in turn can communicate with the nonvolatile serial configuration memory. For example, a CPU can use this communication path created by serial memory access component 110 to read or write to the nonvolatile serial configuration memory 106.

Processor core 112 can be any processor (CPU). For example, processor core 112 is an embedded processor such as Nios II, which is available from Altera Corporation, San Jose. According to various embodiments, processor core 112 is operable to directly/natively access the boot ROM 108 (including the boot copier); serial memory access component 110; on chip memory resources; volatile fast bulk memory 104. Processor core 112 can also indirectly access nonvolatile serial configuration memory 106 through serial memory access component 110.

Figure 2:
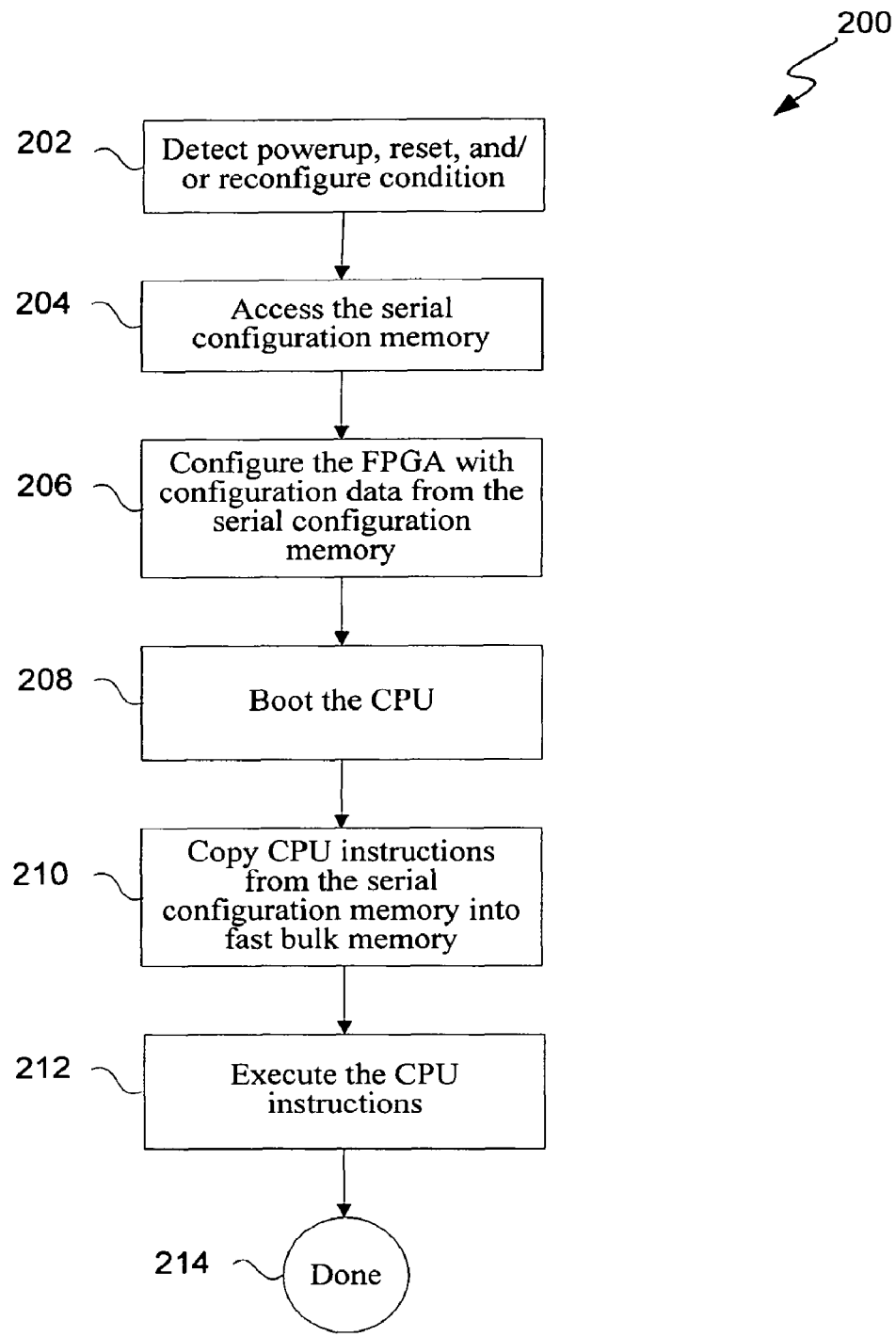
FIG. 2 illustrates a process flow of booting an FPGA-based embedded system according to various embodiments of the present invention.

FIG. 2 illustrates a process flow 200 of booting an FPGA-based embedded system according to various embodiments of the present invention. At operation 202, a predetermined condition/event is detected. Any conventional method or technique may be use for detecting the predetermined condition/event. For example, reading a bit or signal indicating the occurrence of the predetermined condition/event. The predetermined condition/event includes any condition/event where either the CPU must be booted and/or the FPGA must be configured or reconfigured. Such predetermined condition may include powerup, reset, and/or reconfigure conditions. Generally, the powerup condition is when the FPGA/CPU receives power. The reset condition is when the FPGA/CPU receives a reset pulse. The reconfigure condition is when the FPGA/CPU receives a reconfigure pulse. Furthermore, these conditions may result in erasing any information stored within volatile memories associated with the FPGA.

At operation 204, the nonvolatile serial configuration memory is accessed. Any number of operations may be performed to access the nonvolatile serial configuration memory. For instance, the serial memory access component or a state machine associated with the serial memory access component may be used to issue commands to the nonvolatile serial configuration memory for identification. If identification is positive, the serial memory access component will begin issuing read commands to the nonvolatile serial configuration memory for the configuration data. In response, the nonvolatile serial configuration memory will send the configuration data to the serial memory access component where it can be processed. For example, if the configuration data is compressed, the serial memory access component can have the configuration data decompressed using any conventional decompression technique or mechanism.

At operation 206, the FPGA is configured with the configuration data from the nonvolatile serial configuration memory. For instance, the serial memory access component can have the configuration data written to the FPGA's internal configuration SRAM for configuring the FPGA. The configuration data configures the FPGA with an embedded system having various components, including a CPU, an on-chip boot ROM memory with a boot copier, and/or a bus structure for facilitating communication between the various system components (e.g., between the CPU and the boot ROM memory, SDRAM, and serial memory access component). At this point, the FPGA is configured or reconfigured.

At operation 208, the CPU wakes up or "boots up". At this time, the CPU may perform various operations of a boot sequence. For instance, the CPU fetches the first instruction from its reset address, which points to the boot ROM memory. The CPU then executes the code stored in the boot ROM memory.

At operation 210, CPU instructions are copied from the nonvolatile serial configuration memory into fast bulk memory, such as SDRAM or SRAM. According to a specific embodiment, the code in the boot ROM memory is associated with a boot copier. The code may implement any technique for copying the CPU instructions. For instance, the code will initiate the reading of the nonvolatile serial configuration memory's ID code by proxy—by issuing commands to and from the serial memory access component, which in turn accesses the nonvolatile serial configuration memory. The code will also determine the memory size of the nonvolatile serial configuration memory. In addition, the code will determine the location of the CPU instructions within the nonvolatile serial configuration memory.

To further elaborate, the boot copier code may implement the following technique for copying the CPU instructions. First, the boot copier identifies the type of nonvolatile serial configuration memory. Next, the boot copier determines the length of the configuration data stored in the nonvolatile serial configuration memory. This can be achieved by reading the header information of the serial memory image (series of packets containing the configuration data and the CPU instructions) stored in the nonvolatile serial configuration memory (See FIG. 3 below for further details). Next, the boot copier can read the data (CPU instructions) located after the determined length. Since the packets defining the configuration data are typically located at the beginning of the serial memory image and the packets defining the CPU instructions are located immediately after the packets defining the configuration data, reading the data located after the determined length allows the CPU instructions to be copied to the fast bulk memory (e.g., SRAM or SDRAM) in the system. The boot copier can further read the destination address and length of the CPU instructions from the first packet defining the CPU instructions and then copy each byte of the packets out from the nonvolatile serial configuration memory and into the destination address of the SDRAM.

Depending on the construction of the serial memory image, various techniques may be used to copy the CPU instructions from the serial memory image. For example, the configuration data can be located at the beginning of the serial memory image whereas the CPU instructions can be located at the end of the serial memory image. As such, the boot copier can read from the end of the serial memory image and work backwards to copy the CPU instructions from the serial memory image. It will be appreciated by those skilled in the art that other techniques may be used for copying the CPU instructions.

After the CPU instructions have been copied to the fast bulk memory, the boot copier is operable to have the CPU jump to the CPU instructions in the fast bulk memory. At operation 212, the CPU executes the CPU instructions located at the fast bulk memory. Finally, at operation 214, process flow 200 ends.

Figure 3:
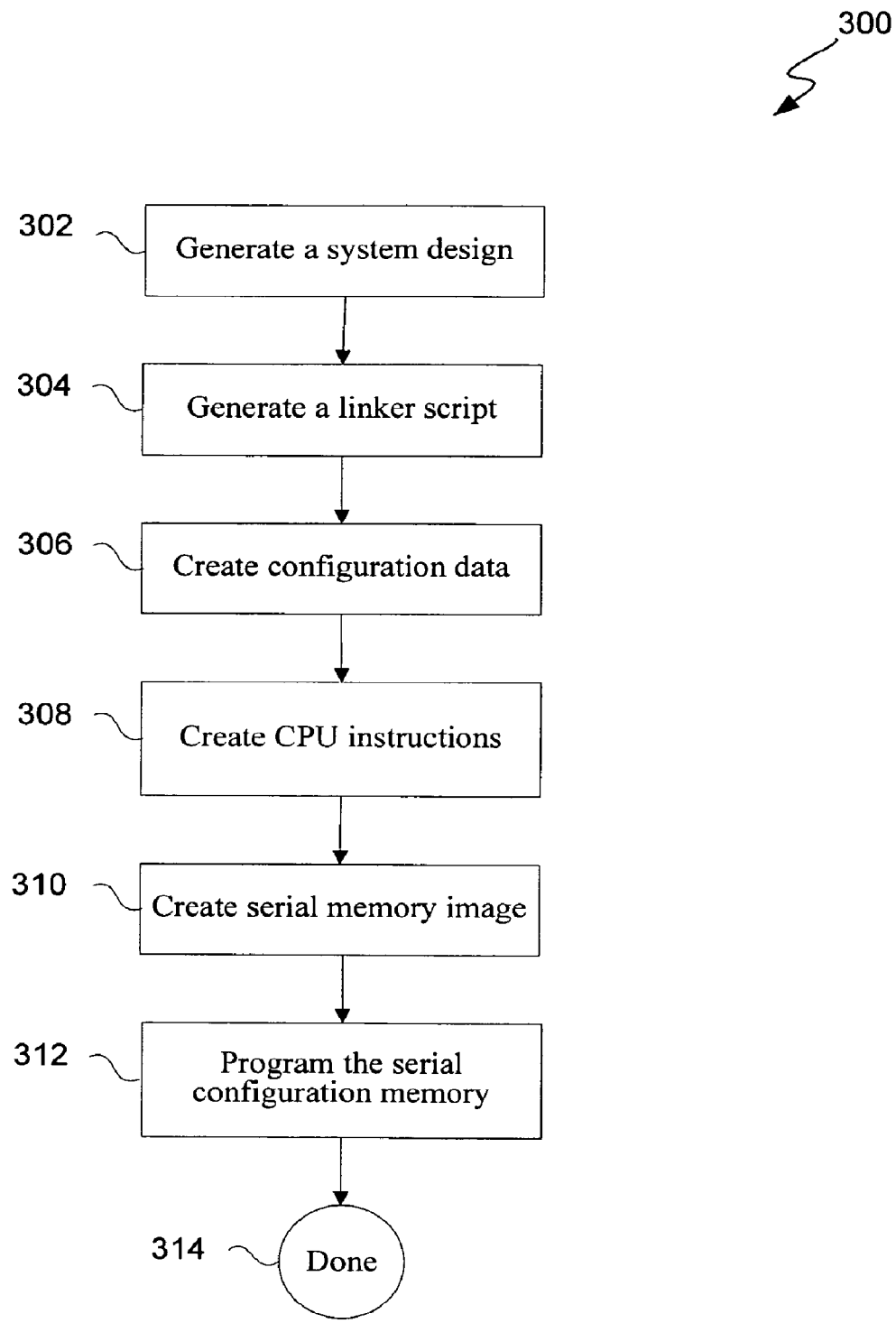
FIG. 3 illustrates a process flow of providing configuration data and CPU instructions in a serial configuration memory according to various embodiments of the present invention.

FIG. 3 illustrates a process flow 300 of providing configuration data and CPU instructions in a nonvolatile serial configuration memory according to various embodiments of the present invention. Beginning at operation 302, a system design is generated. The system design may include various components, such as a CPU 112, peripheral interfaces (e.g., SDRAM controller, serial memory access component 110), boot ROM, bus structure, etc. The boot ROM can contain a software loop that accesses the serial memory component, copies CPU instructions to SDRAM or SRAM, and then transfers CPU execution to these CPU instructions. Any system design tool may be used to generate the system design as well as execute any portion of process flow 300. For example, Quartus II and SOPC Builder, which are available from Altera Corporation, San Jose, can be used to generate the system design.

At operation 304, a linker script is generated. The linker script can be any code for identifying the location of the CPU instructions. In one embodiment, the linker script "locates" the CPU instructions in the SRAM or SDRAM. As such, the CPU executes CPU instructions from SRAM or SDRAM, even though these instructions are not stored there initially. At operation 306, configuration data is created. Configuration data allows a programmable device (e.g., FPGA; PLD) to be configured with the system design. Generally, configuration data is created by compiling the generated system design using any suitable system design tool (e.g., Quartus II).

At operation 308, CPU instructions are created. CPU instructions may include any portion of a software program for execution by the CPU. According to one embodiment, CPU instructions is an object file, which the linker script makes reference to in its code. At operation 310, a serial memory image is created. The serial memory image contains the configuration data and the CPU instructions merged together into an image for storing onto a nonvolatile serial configuration memory. It will be appreciated by those skilled in the art that various techniques may be used for creating the serial memory image. For instance, the object file containing the CPU instructions can be converted into a series of packets that are appended to the end of the FPGA configuration data. The serial memory image can be a generated bit stream for programming the nonvolatile serial configuration memory. At operation 312, the nonvolatile serial configuration memory is programmed with the serial memory image. As such, the serial memory image is stored in the nonvolatile serial configuration memory. In one embodiment, a serial memory programmer is used to program the nonvolatile serial configuration memory with the serial memory image.

Finally, process flow 300 ends at operation 314. It will be appreciated by those skilled in the art that any portion of process flow 300 may be omitted, modified, or repeated. For example, by modifying operations 306 and 308 to include other types of data, the present invention allows efficient programming of multiple types of data into a nonvolatile serial configuration memory.

Figure 4:
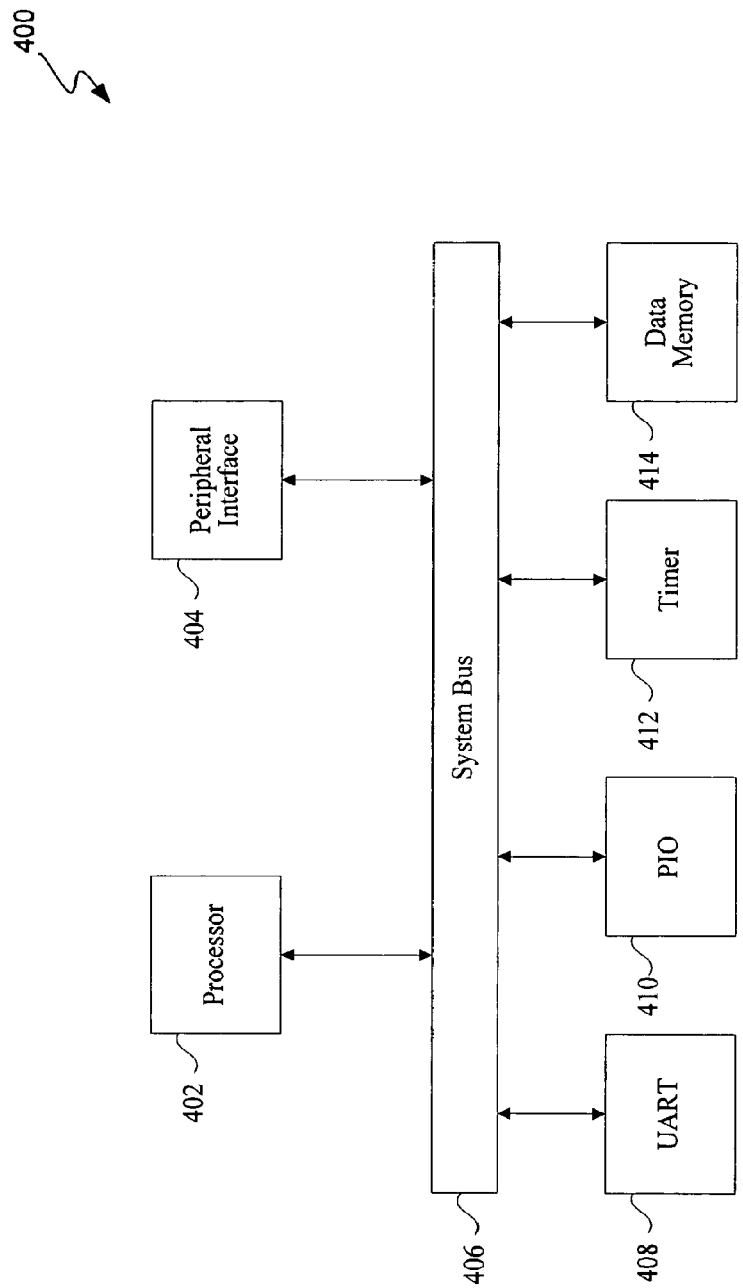
FIG. 4 is a diagrammatic representation showing a system on a programmable chip.

FIG. 4 is a diagrammatic representation showing a system 400 on a programmable chip having a processor core, peripheral devices, and peripheral interfaces. Peripheral devices and peripheral interfaces are herein referred to as components. The system on a programmable chip includes processor core 402 and a peripheral interface 404 as well as peripheral components UART 408, PIO 410, timer 412, and data memory 414. Peripheral components may also include a boot ROM and a serial memory access component. In some examples, the peripheral interface 404 is a memory controller (e.g., SDRAM controller) with an associated bus bridge. It should be noted that the system can include both on-chip and off-chip memory.

Any component or device that is operable to initiate read and/or write operations by providing control information is referred to herein as a primary component. Primary components are sometimes referred to herein as master components. Control information can include a particular address associated with a secondary component. Any component or device that responds to read or write operations with information sent back to the primary component regarding the read or write operation is referred to herein as a secondary component. Secondary components are sometimes referred to herein as slave components. Some examples of primary components include processors, microcontrollers, and Ethernet devices. Some examples of secondary components include Universal Asynchronous Receiver Transmitters (UARTs), Parallel Input Output (PIO), program memory, and data memory. It should be noted that some components such as an Ethernet component can be both a primary component and a secondary component, because an Ethernet component has the capability of reading and writing to the secondary program memory while also responding to instructions from a primary system CPU.

System bus 406 provides interconnectivity amongst the components in digital system 400. In one embodiment, system bus 406 includes a conventional bus architecture. In another embodiment, system bus 406 includes a simultaneous multiple primary component fabric, such as the Avalon™ Switch Fabric available from Altera Corporation, San Jose, Calif.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and fast cascade chain, register and preset/reset logic for the register.

Figure 5:
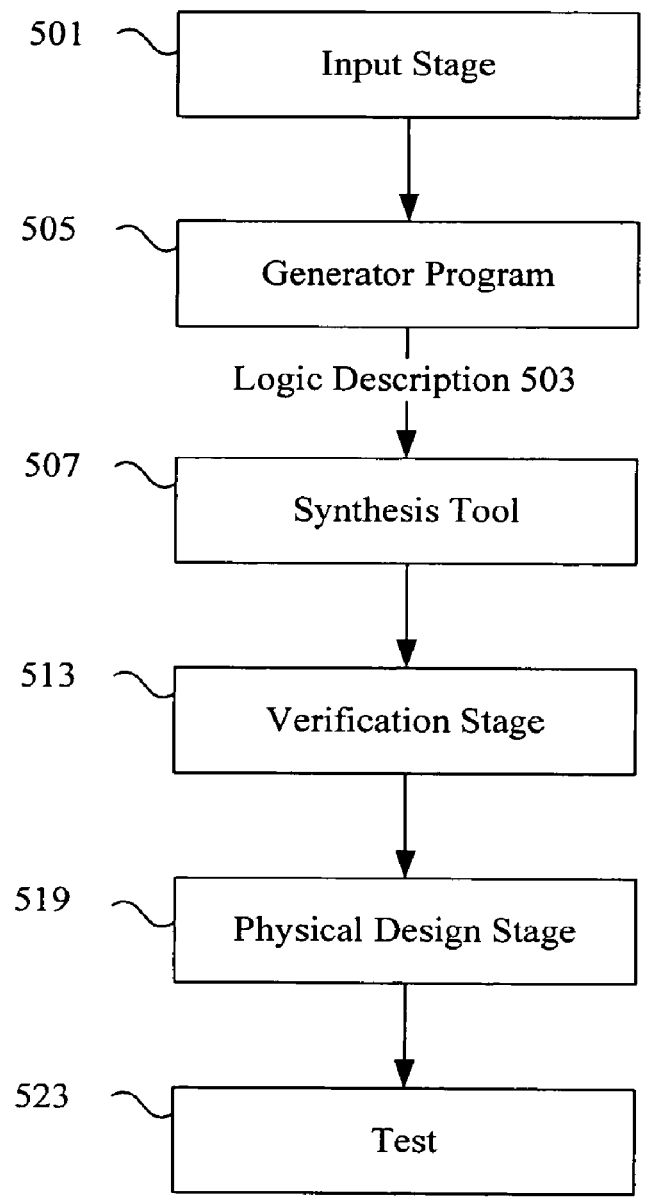
FIG. 5 is a diagrammatic representation showing implementation of a programmable chip.

FIG. 5 is a diagrammatic representation showing implementation of an electronic device (e.g., programmable chip) using a programmable chip tool. An input stage 501 receives selection information typically from a user for logic such as a processor core as well as other components such as a boot ROM or boot copier to be implemented on an electronic device. A generator program 505 creates a logic description and provides the logic description along with other customized logic to any of a variety of synthesis tools, place and route programs, and logic configuration tools to allow a logic description to be implemented on an electronic device.

In one example, an input stage 501 often allows selection and parameterization of components to be used on an electronic device. In some examples, components provided to an input stage include intellectual property functions, megafunctions, and intellectual property cores. The components may be stored and retrieved from a library or database. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various components selected.

In typical implementations, the generator program 505 can identify the selections and generate a logic description with information for implementing the various components. The generator program 505 can be a Perl script creating HDL files such as Verilog, Abel, VHDL, and AHDL files from the module information entered by a user. According to various embodiments, the generator program 505 also provides information to a synthesis tool 507 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. Similarly, input stage 501, generator program 505, and synthesis tool 507 can be integrated into a single program.

For example, SOPC Builder tool available from Altera Corporation, San Jose, Calif. integrates different stages of the electronic device implementation into a single program while implementing various techniques and mechanisms of the present invention. In particular, SOPC Builder tool provides system-level design flows for SOPC architectures. SOPC Builder tool may automatically generate interconnect logic (e.g., Avalon™ switch fabric) connecting components used in SOPC applications. The components include embedded processors that may either be internal or external to the FPGA and peripherals.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507.

A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 513 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 513, the synthesized netlist file can be provided to physical design tools 519 including place and route and configuration tools. A place and route tool typically locates logic cells on specific logic elements of a target hardware device and connects wires between the inputs and outputs of the various logic elements in accordance with logic required to implement an electronic design. The device can also be physically tested at 523.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif.

As noted above, different stages and programs can be integrated in a variety of manners. According to one embodiment, the input stage 501, the generator program 505, the synthesis tool 507, the verification tools 513, and physical design tools 519 are integrated into a single program. The various stages are automatically run and transparent to a user. The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Figure 6:
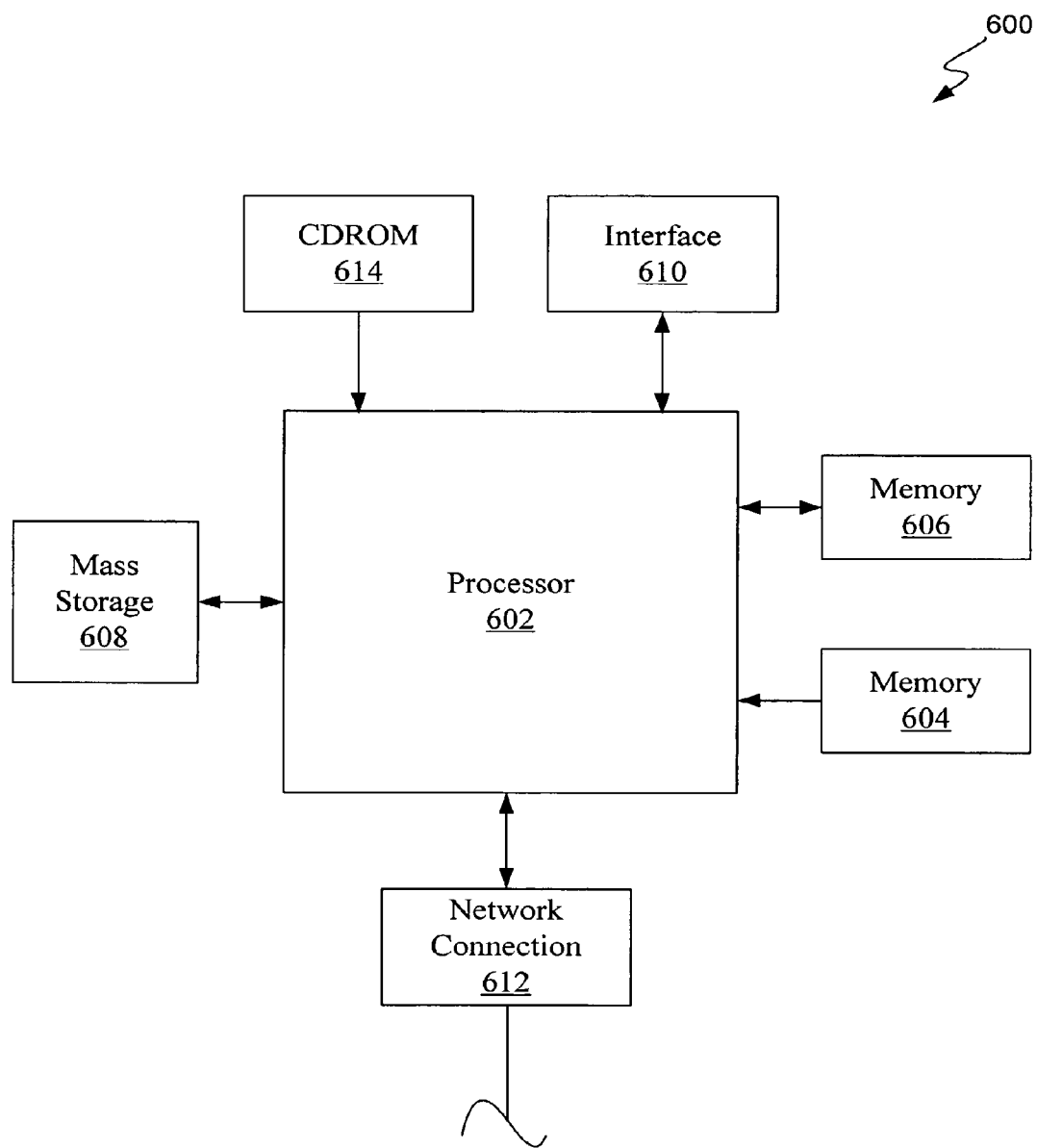
FIG. 6 illustrates a computer system suitable for implementing various embodiments of the present invention.

FIG. 6 illustrates a computer system suitable for implementing various embodiments of the present invention. The computer system 600 includes any number of processors 602 (also referred to as central processing units, or CPUs) that are coupled to devices including memory 606 (typically a random access memory, or "RAM"), memory 604 (typically a read only memory, or "ROM"). As is well known in the art, memory 604 acts to transfer data and instructions uni-directionally to the CPU and memory 606 is used typically to transfer data and instructions in a bi-directional manner.

Both of these memory devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than memory. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display wizards and subwizards to a user. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. It should be noted that the system 600 may also be associated with devices for transferring completed designs onto a programmable chip. The above-described devices and materials will be familiar to those of skill in the computer hardware and software arts.

The hardware elements described above may be configured to act as multiple software modules for performing the operations of this invention. For example, instructions for running a tool, generator program, input stage (e.g., a wizard), and/or compiler may be stored on mass storage device 608 or 614 and executed on CPU 602 in conjunction with primary memory 606.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the booting of an FPGA-based system may just reset the CPU (configured FPGA) without reconfiguring the FPGA. In this case, operations 204 and 206 can be omitted from process flow 200 in FIG. 2. Therefore, the scope of the invention should be determined with reference to the appended claims.

What is claimed is:

1. A programmable device comprising a booting mechanism including a serial memory access component and a boot read only memory (ROM), wherein the boot ROM is configured to store a boot copier, wherein the boot copier is configured to issue a command to the serial memory access component to copy a plurality of central processing unit (CPU) instructions from a nonvolatile serial configuration memory to a volatile memory, wherein the booting mechanism is configured to serially access upon occurrence of a predetermined condition the CPU instructions stored in the nonvolatile serial configuration memory, wherein the boot copier is configured to identify and read the nonvolatile serial configuration memory and determine a location of the CPU instructions within the nonvolatile serial configuration memory based on a length of configuration data stored within the nonvolatile serial configuration memory.

2. The programmable device of claim 1, wherein the serial memory access component includes a data input pin, a data output pin, and a clock input pin.

3. The programmable device of claim 1, wherein the nonvolatile serial configuration memory is located off-chip and both the serial memory access component and the boot ROM are located on-chip.

4. The programmable device of claim 1, further comprising a CPU configured to execute the CPU instructions from the volatile memory after the CPU instructions are serially accessed.

5. The programmable device of claim 1, wherein the volatile memory includes a static random access memory (SRAM) or a synchronous dynamic RAM (SDRAM).

6. The programmable device of claim 1, wherein the booting mechanism is configured to perform the serial access by serially accessing a portion of a serial memory image from the nonvolatile serial configuration memory.

7. The programmable device of claim 1, wherein the programmable device is implemented using an SOPC Builder.

8. A programmable device in accordance with claim 1, wherein the length of configuration data is determined by reading header information.

9. A method for booting a programmable device, said method comprising:
    issuing a command from a boot copier of a boot read only memory (ROM) to copy a plurality of central processing unit (CPU) instructions from a nonvolatile serial configuration memory;
    serially accessing the nonvolatile serial configuration memory upon said issuing the command; and
    copying the CPU instructions from the nonvolatile serial configuration memory to a volatile memory by said serially accessing the nonvolatile serial configuration memory, wherein the boot copier is executed to identify and read the nonvolatile serial configuration memory and determine a location of the CPU instructions within the nonvolatile serial configuration memory based on a length of configuration data stored within the nonvolatile serial configuration memory.

10. A method in accordance with claim 9, wherein said serially accessing is performed via a serial access memory component including a data input pin, a data output pin and a clock input pin.

11. A method in accordance with claim 9, wherein the nonvolatile serial configuration memory is located off-chip and the boot ROM is located on-chip.

12. A method in accordance with claim 9, further comprising storing the boot copier within the boot ROM.

13. A method in accordance with claim 9, further comprising executing, by an on-chip CPU, the CPU instructions from the volatile memory.

14. A method in accordance with claim 9, wherein the nonvolatile memory includes a static random access memory (SRAM) or a synchronous dynamic RAM (SDRAM).

15. A method in accordance with claim 9, wherein said serially accessing comprises serially accessing a portion of a serial memory image from the nonvolatile serial configuration memory.

16. A method in accordance with claim 9, further comprising generating the boot ROM, the volatile memory, and the nonvolatile serial configuration memory by using an SOPC Builder.

17. A method in accordance with claim 9, wherein the length of configuration data is determined by reading header information.

18. A programmable device comprising:
  means for issuing a command to copy a plurality of central processing unit (CPU) instructions from a nonvolatile serial configuration memory;
  means for serially accessing the nonvolatile serial configuration memory upon said issuing the command;
  means for copying the CPU instructions from the nonvolatile serial configuration memory to a volatile memory by performing the serial access of the nonvolatile serial configuration memory;
  means for identifying the nonvolatile serial configuration memory; and
  means for determining a location of the CPU instructions within the nonvolatile serial configuration memory, wherein a location of the CPU instructions within the nonvolatile serial configuration memory is determined based on a length of configuration data stored within the nonvolatile serial configuration memory.

19. A programmable device in accordance with claim 18, wherein the nonvolatile serial configuration memory is located off-chip and the means for issuing the command is located on-chip.

20. A programmable device in accordance with claim 18, further comprising means for executing the CPU instructions from the volatile memory after performing the serial access of the CPU instructions.

21. A programmable device in accordance with claim 18, wherein said means for serially accessing includes means for serially accessing a portion of a serial memory image from the nonvolatile serial configuration memory.

22. A programmable device in accordance with claim 18, further comprising means for determining the length of configuration data by reading header information.

* * * * *